(12) United States Patent
Bornhorst

(10) Patent No.: US 6,862,983 B2
(45) Date of Patent: Mar. 8, 2005

(54) DUAL HIGH PRESSURE ROTARY UNION FOR MECHANICAL POWER PRESS

(75) Inventor: John B. Bornhorst, New Bremen, OH (US)

(73) Assignee: The Minster Machine Company, Minster, OH (US)

( * ) Notice: Subject to any disclaimer, the term of this patent is extended or adjusted under 35 U.S.C. 154(b) by 127 days.

(21) Appl. No.: 10/100,951

(22) Filed: Mar. 19, 2002

(65) Prior Publication Data

US 2002/0163185 A1 Nov. 7, 2002

Related U.S. Application Data

(60) Provisional application No. 60/277,670, filed on Mar. 21, 2001.

(51) Int. Cl.[7] .............................. B30B 1/06; F01M 1/06; F16L 39/04
(52) U.S. Cl. ...................... 100/282; 100/299; 184/6.14; 285/120.1
(58) Field of Search ................................ 100/280, 282, 100/299; 104/6.14; 285/120.1, 121.3, 121.6

(56) References Cited

U.S. PATENT DOCUMENTS

| | | | |
|---|---|---|---|
| 4,375,785 A | * | 3/1983 | Schoch et al. ................ 100/35 |
| 5,022,686 A | * | 6/1991 | Heel et al. ................ 285/121.4 |
| 5,901,643 A | | 5/1999 | Bornhorst |
| 6,109,659 A | | 8/2000 | Heidenreich et al. |
| 6,494,116 B2 | * | 12/2002 | Horie ........................ 74/571 R |

\* cited by examiner

Primary Examiner—Allen Ostrager
Assistant Examiner—Jimmy Nguyen
(74) Attorney, Agent, or Firm—Randall J. Knuth

(57) ABSTRACT

A fluid delivery system supplies two or more fluids to a rotatable shaft integrated within a device such as a mechanical press and develops damped clearance spaces at the bearing surfaces of the fluid coupling device. In one arrangement, a rotary union is adapted for driving rotation by the shaft and provides two fluid pathways disposed in flow communication with a fluid access channel formed in the shaft. Bearing support is provided by an oil film present within a clearance space defined between the rotary union and a stationary housing disposed thereabout. In another arrangement, a stationary fluid transfer device is adapted for non-rotation and disposed within a crankshaft cavity to define a clearance space there between. A fluid pathway formed therein communicates fluid to the crankshaft access channel. Bearing support is provided by an oil film present in the clearance space. There are no sliding face seals in the arrangements.

7 Claims, 3 Drawing Sheets

DUAL HIGH PRESSURE ROTARY UNION FOR MECHANICAL POWER PRESS

CROSS REFERENCES TO RELATED APPLICATIONS

This application claims priority under 35 U.S.C. 109 (e) from U.S. Provisional Application Ser. No. 60/277,670 filed Mar. 21, 2001, which application is incorporated herein by reference.

BACKGROUND OF THE INVENTION

1. Field of the Invention

The present invention generally relates to an apparatus for delivering two or more fluids to a rotary device, and, more particularly, to a dual fluid delivery system including a rotary union which is adapted for use in a mechanical press or other device to supply fluid to the shaft or device and which provides damped clearance spaces at its bearing surfaces.

2. Description of the Related Art

Mechanical presses are generally provided with a frame structure having a crown and bed in which a slide member is supported for reciprocating movement relative to the bed. A crankshaft mounted within the frame structure translates rotary motion generated by a drive mechanism into reciprocating linear activity that is coupled to the slide member through an intermediate assembly of connecting rods. During the press stroke, the upper die mounted to the slide member is brought into pressed engagement with a lower die mounted to a bolster, which in turn is secured to the bed. Mechanical presses of this construction, such as straight side presses and gap frame presses, are widely used for blanking and drawing operations and vary substantially in size and available tonnage depending upon their intended use.

The flywheel assembly serves as the primary source of stored mechanical energy and rotary driving power in the mechanical press. Standard configurations have the flywheel located between the main drive motor and clutch, while being mounted on either the driveshaft, crankshaft, or press frame by use of a quill. The main drive motor replenishes the flywheel with rotational energy as it becomes depleted due to the on-going press stamping operations, during which the clutch engages the flywheel and establishes a driving connection with the crankshaft that acts to draw energy away from the flywheel and convert it into useful mechanical work for powering the press components.

One aspect of mechanical press construction important to its durability and effectiveness concerns whether an adequate lubrication system has been provided to supply the bearing supports with sufficient amounts of pressurized fluid. This concern is vitally important to mechanical presses that rely upon rotary devices such as crankshafts, flywheels, and drive shafts to consistently generate high levels of torquing power necessary to meet the load requirements of the particular industrial application. A two-fold problem exists in attempting to supply oil to these rotary components. First, the rotational motion makes it difficult to transmit oil to the bushing clearance areas from an external source. Furthermore, it is difficult to provide adequate sealing protection to a rotating machine without introducing the risk of friction-related structural degradation, which occurs due to the abrasive contact between the seal and the adjoining rotating surface.

One conventional approach to providing such oil delivery involves the use of a stationary rotary union that supplies oil to the rotating crankshaft. A seal secured to the rotary union is provided at the interface between the rotary union and the adjacent crankshaft in order to prevent fluid leakage. However, as noted above, it is difficult to provide a durable seal in the manner described because the stationary sealing member, which is disposed in abutting contact with the rotating device, is constantly being subjected to frictional pressures that develop due to the sliding contact between the rotating shaft and the intimately coupled sealing member. It is therefore desirable to provide a system for lubricating the bearing supports that incorporates a rotary union but avoids any implementation requiring a sealing member to be placed in direct contact with the crankshaft or other rotary machine surface.

The conventional rotary union attempts to minimize the seal damage arising from frictional influences by employing anti-friction bearings. However, this bearing arrangement presents problems because the free and undamped clearance it establishes with adjacent machine surfaces leads to pounding out of parts when high levels of vibration severity occur during the stamping operation. It is therefore desirable to provide a rotary union that is devoid of any free and undamped clearances.

SUMMARY OF THE INVENTION

The present invention is directed to a fluid delivery system for supplying two or more fluids (at possibly different or the same pressures) to a rotary machine utilizing a flow coupling device provided in the form of a rotary union or stationary union component and which develops damped clearance spaces at the bearing surfaces of the coupling device. The system is preferably adapted for use in a mechanical press or other machine to provide fluid to a rotatable shaft or element having a bore channel provided therein. In one embodiment, the fluid delivery system includes a rotary union which is adapted for driving rotation by the shaft and which provides two or more fluid pathways disposed in flow communication with the shaft or element's bore channel. A stationary housing is provided to define a clearance space with at least part of the rotary union. The stationary housing provides a fluid pathway arranged in flow communication with the clearance space and which enables flow communication with the fluid pathway formed in the rotary union. A seal fixedly attached to the stationary housing prevents fluid leakage from the clearance space. A tube or passageway interfits into the shaft or element to communicate or allow communication of the appropriate fluid to a desired area.

In another embodiment, the fluid delivery system includes a fluid transfer device which is adapted for non-rotation and which is disposed at least in part within a cavity of the crankshaft to define a clearance space there between. The fluid transfer device transfers fluid received at an inlet thereof to the clearance space and to the crankshaft bore channel. A seal integrally associated with the crankshaft prevents fluid leakage from the clearance space.

The invention comprises, in one form thereof, a fluid delivery system for supplying two or more fluids to a rotary machine. The system has a shaft having two or more fluid pathways. Also the system has a rotary union, disposed for driving rotation by the shaft, and in fluid communication with the two or more fluid pathways provided in the shaft. Furthermore, a housing defining a clearance space of at least part of the rotary union and providing a fluid pathway disposed in fluid communication with the clearance space. The clearance space is disposed in fluid communication with the rotary union. Finally, the system comprises a sealing means for sealably securing the clearance space.

The invention comprises, in another form thereof, a mechanical press having a frame structure with a crown and a bed. A slide is guided by the frame structure for reciprocating movement in opposed relation to the bed. A drive mechanism is associated with the frame structure. A flywheel assembly is rotatably driven by the drive mechanism and the flywheel assembly includes a flywheel rotatable relative to the frame structure. A shaft is rotatably disposed within the crown and in driving connection with the slide wherein the shaft includes two or more fluid pathways formed therein. A clutch assembly for selectively connecting the flywheel to the shaft for driving rotation is provided. A fluid delivery system for providing fluid to the two or more fluid pathways formed in the shaft comprises a rotary union, disposed for driving rotation by the shaft, and in fluid communication with the two or more fluid pathways formed in the shaft. The fluid delivery system also has a housing means for defining a clearance space with at least part of the rotary union and for providing two or more fluid pathways disposed in fluid communication with the clearance space and the clearance space is disposed in fluid communication with the rotary union. The fluid delivery system also has a sealing means for sealably securing the clearance space.

The invention comprises, in another form thereof, a fluid delivery apparatus, operatively associated with a mechanical press, including a rotatable shaft having two or more fluid pathways provided therein for delivering fluid to the shaft wherein the fluid delivery apparatus comprises a fluid transfer means, adapted for non-rotation and disposed at least in part within a cavity of the shaft to define a clearance space there between. The fluid transfer means provides two or more fluid pathways disposed in fluid communication with the two or more fluid pathways provided in the shaft wherein the clearance space is disposed in fluid communication with at least one of the two or more fluid pathways provided by the fluid transfer means. Also, a sealing means for sealably securing the clearance space is provided.

The invention comprises, in another form thereof, a mechanical press having a frame structure with a crown and bed. A slide is guided by the frame structure for reciprocating movement in opposed relation to the bed. The drive mechanism is associated with the frame structure. A flywheel assembly is rotatably driven by the drive mechanism wherein the flywheel assembly includes a flywheel rotatable relative to the frame structure. A shaft is rotatably disposed within the crown and in driving connection with the slide wherein the shaft includes two or more fluid pathways formed therein. A clutch assembly for selectively connecting the flywheel to the shaft for driving rotation thereof is provided. A fluid delivery system for providing fluid to the two or more fluid pathways formed in the shaft wherein the fluid delivery system comprises a fluid transfer means having two or more inlets, adapted for non-rotation and disposed at least in part within a cavity of the shaft to define a clearance space there between. The fluid transfer means is for transferring fluid received at the two or more inlets to the clearance space and to the two or more fluid pathways formed in the shaft. The fluid delivery system also has a sealing means for sealably securing the clearance space defined between the shaft cavity and the fluid transfer means.

The invention comprises, in another form thereof, an apparatus for delivering fluid to a rotatable crankshaft having a two or more bore channels provided therein. The apparatus comprises a rotary union means, which is disposed for driving rotation by the crankshaft, for providing two or more fluid pathways disposed in fluid communication with the crankshaft bore channels. The apparatus further comprises a housing to define a clearance space with at least part of the rotary union means and to provide a fluid pathway disposed in fluid communication with the clearance space. A sealing means is provided for sealably securing the clearance space. The clearance space is disposed in fluid communication with the fluid pathways provided by the rotary union means. The housing is arranged as a stationary structure, while the sealing means is preferably secured in fixed relation to the housing.

A supply means, which is rigidly coupled to the housing, is further provided for supplying fluid to the fluid pathways formed in the housing. The supply means includes, in one form thereof, two or more pipes which are adapted at one end for rigid coupling to the housing at the fluid pathways thereof permitting flow communication there between, and which is adapted at another end thereof to receive an inflow of pressurized fluid. There is further provided a source of fluid in flow communication with the pipe at the another end thereof and a means for rigidly securing the pipe.

The rotary union means includes, in one form thereof, a head portion associated with the clearance space defined in relation to the housing; and a body portion integral with the head portion and coupled to the crankshaft. The head portion forms, in one aspect thereof, a discontinuous boundary with the body portion to form an effective thrust bearing structure which acts with fluid present in the clearance space associated therewith to oppose axial movement of the rotary union means. A seal is rigidly secured to the housing and annularly disposed about the body portion of the rotary union means. There is a drain line between the seal and the oil film bearing to prevent oil pressure buildup.

The invention comprises, in another form thereof, a mechanical press, comprising a frame structure with a crown and a bed; a slide guided by the frame structure for reciprocating movement in opposed relation to the bed; a drive mechanism associated with the frame structure; a flywheel assembly rotatably driven by the drive mechanism, wherein the flywheel assembly includes a flywheel rotatable relative to the frame structure; a crankshaft rotatably disposed within the crown and in driving connection with the slide, wherein the crankshaft includes two or more bore channels formed therein; a clutch assembly for selectively connecting the flywheel to the crankshaft for driving rotation thereof; and a fluid delivery system for providing fluid to the bore channels formed in the crankshaft. The fluid delivery system comprises a rotary union means, which is disposed for driving rotation by the crankshaft, for providing two or more fluid pathways disposed in fluid communication with the bore channels formed in the crankshaft; and further comprises a housing means for defining a clearance space with at least part of the rotary union means and for providing a fluid pathway disposed in fluid communication with the clearance space. A sealing means is provided for sealably securing the clearance space. The clearance space is disposed in fluid communication with the fluid pathways provided by the rotary union means. There is further provided a means, which is associated with the crankshaft, for conveying fluid pressures from the bore channels of the crankshaft to the clutch assembly. The housing means is stationary and the sealing means is preferably secured in fixed relation to the housing means.

There is further provided a supply means, which is rigidly coupled to the housing means, for supplying fluid to the fluid pathways provided by the housing means. The supply means includes, in one aspect thereof, two or more pipes which are adapted at one end for rigid coupling to the housing means at the fluid pathways thereof permitting flow communication there between, and which is adapted at another end thereof to receive an inflow of pressurized fluid.

The invention comprises, in yet another form thereof, an apparatus, operatively associated with a mechanical press including a rotatable crankshaft having two or more bore channels provided therein, for delivering fluid to the crankshaft. The fluid delivery apparatus comprises a rotary union which is rigidly coupled to the crankshaft to enable concurrent rotation therewith and which is operative to transfer fluid from two or more inlets thereof to the bore channels provided in the crankshaft. The apparatus further comprises a means, which is associated with the rotary union, for providing lubricating support to the rotary union and which is adapted at least in part for flow communication with the inlets of the rotary union. The support means includes, in one form thereof, a housing defining a clearance space with at least part of the rotary union. The apparatus further includes a flow communication means that is arranged to provide flow communication with the clearance space sufficient to enable flow communication with the inlets of the rotary union. The flow communication means includes, in one form thereof, a fluid pathway formed in the housing and which is disposed in flow communication with the clearance space. The rotary union includes, in one form thereof, a fluid pathway establishing fluid communication from the rotary union inlets to at least the bore channels provided in the crankshaft.

The invention comprises, in yet another form thereof, a system for delivering fluid to a rotary member having two or more fluid passageways provided therein. The system comprises: a rotary device means, which is disposed for driving rotation by the rotary member, for providing fluid received at two or more inlets thereof to the fluid passageways provided in the rotary member; a housing defining a clearance space with at least part of the rotary device means, wherein the clearance space is disposed in fluid communication with the inlets of the rotary device means and a flow communication means arranged to provide flow communication with the clearance space sufficient to enable flow communication with the inlets of the rotary device means. A seal fixedly secured to the housing prevents leakage from the clearance space. The rotary union has a drain line which eliminates any oil pressure on the seal. The housing is configured for stationary placement. In a preferred form thereof, the rotary member includes a crankshaft and the associated fluid passageways include two or more bore channels formed in the crankshaft. The flow communication means includes, in one form thereof, a fluid pathway formed in the housing and disposed in flow communication with the clearance space.

The invention comprises, in yet another form thereof, a system for delivering fluid to a rotary member having two or more fluid passageways provided therein. The system comprises a rotary union means, which is disposed for driving rotation by the rotary member, for providing two or more fluid pathways disposed in fluid communication with the fluid passageways provided in the rotary member; and further comprises a support means which is adapted at least in part for flow communication with the fluid pathways provided by the rotary union means and which is arranged to provide operative bearing support to the rotary union means. The support means includes, in one form thereof, a housing means defining a clearance space with at least part of the rotary union means and for providing a fluid pathways which is disposed in fluid communication with the clearance space and which enables fluid communication with the fluid pathways provided by the rotary union means. The housing means is preferably stationary and is integrally associated with a sealing means secured thereto for sealing the clearance space.

The invention comprises, in another embodiment thereof, an apparatus for delivering fluid to a rotatable crankshaft having two or more bore channels provided therein. The fluid delivery apparatus includes a fluid transfer means, which is adapted for non-rotation and which is disposed at least in part within a cavity of the crankshaft to define a clearance space there between, for transferring fluid received at two inlets thereof to the clearance space and to the bore channels provided in the crankshaft. A sealing means is provided for sealably securing the clearance space.

The fluid transfer means includes, in one aspect thereof, two or more fluid pathways enabling fluid communication between the inlets and the bore channels provided in the crankshaft. The clearance space is preferably arranged in fluid communication with the fluid pathway provided by the fluid transfer means. The fluid pathways provided by the fluid transfer means includes, in one form thereof, at least two or more main passageways arranged in fluid registration with two or more inlets of the fluid transfer means and with the two or more bore channels provided in the crankshaft. The fluid pathways further includes at least one branch passageway providing fluid communication between the at least one main passageway and the clearance space. In a preferred form thereof, the at least one branch passageway includes at least one pair of branch passageways extending in opposite radial directions.

There is further provided a supply means, which is rigidly coupled to the fluid transfer means at the inlets thereof, for supplying fluid thereto. The supply means includes, in one aspect thereof, two or more pipes which are adapted at one end for rigid coupling to the fluid transfer means at the inlets thereof to permit flow communication there between, and which is adapted at another end thereof to receive an inflow of pressurized fluid. A means is provided for rigidly securing the pipes.

There is further provided a thrust bearing integrally associated with the crankshaft at the cavity thereof and which defines a clearance space with the fluid transfer means. The thrust bearing acts in concert with a fluid film present in the clearance space associated therewith to oppose axial movement of the fluid transfer means. A seal is rigidly secured to the thrust bearing and disposed about the fluid transfer means. There is a drain line between the seal and the oil film bearing.

The invention comprises, in yet another form thereof, a mechanical press, comprising a frame structure with a crown and a bed; a slide guided by the frame structure for reciprocating movement in opposed relation to the bed; a drive mechanism associated with the frame structure; a flywheel assembly rotatably driven by the drive mechanism, wherein the flywheel assembly includes a flywheel rotatable relative to the frame structure; a crankshaft rotatably disposed within the crown and in driving connection with the slide, wherein the crankshaft includes two or more bore channels formed therein; a clutch assembly for selectively connecting the flywheel to the crankshaft for driving rotation thereof; and a fluid delivery system for providing fluid to the bore channels formed in the crankshaft. The fluid delivery system includes a fluid transfer means, which is adapted for non-rotation and which is disposed at least in part within a cavity of the crankshaft to define a clearance space there between, for transferring fluid received at two or more inlets thereof to the clearance space and to the two or more bore channels formed in the crankshaft. A sealing means is provided for sealably securing the clearance space.

The fluid transfer means includes, in one aspect thereof, a fluid pathway enabling fluid communication between the inlets thereof and the bore channels formed in the crankshaft. The clearance space is preferably disposed in fluid communication with the fluid pathway.

The invention comprises, in yet another form thereof, an apparatus, which is operatively associated with a mechanical press including a rotatable crankshaft having two or more bore channels provided therein, for delivering fluid to the crankshaft. The fluid delivery apparatus includes a fluid transfer means, which is adapted for non-rotation and which is disposed at least in part within a cavity of the crankshaft to define a clearance space there between, for providing two or more fluid pathways disposed in fluid communication with the two or more crankshaft bore channels. The clearance space is preferably disposed in fluid communication with the fluid pathways provided by the fluid transfer means. A sealing means is provided for sealably securing the clearance space.

The invention comprises, in still yet another form thereof, an apparatus for delivering fluid to a rotatable crankshaft having two or more bore channels provided therein. The fluid delivery apparatus includes a fluid transfer means, which is disposed at least in part within a cavity of the crankshaft to define an insert body thereof and which defines a clearance space between at least part of the insert body and the crankshaft cavity, for providing fluid pathways disposed in fluid communication with the two or more crankshaft bore channels. The clearance space is preferably disposed in fluid communication with the fluid pathways. A fluid source means supplies a fluid flow to the fluid pathways provided by the fluid transfer means. A sealing means is provided for sealably securing the clearance space.

The invention comprises, in still yet another form thereof, a system for delivering fluid to a rotary member having two or more fluid passageways provided therein. The fluid delivery system includes a fluid transfer means, which is adapted for non-rotation and which is disposed at least in part within a cavity of the rotary member to define a clearance space there between, for transferring fluid received at two or more inlets thereof to the clearance space and to the fluid passageways provided in the rotary member. A sealing means is provided for sealably securing the clearance space. In a preferred form thereof, the rotary member includes a crankshaft, while the associated fluid passageways includes two or more bore channels formed in the crankshaft.

The invention comprises, in still yet another form thereof, a system for delivering fluid to a rotary member having two or more fluid passageways provided therein. The fluid delivery system includes a fluid transfer means, which is adapted for non-rotation and which is disposed at least in part within a cavity of the rotary member to define a clearance space there between, for providing fluid pathways disposed in fluid communication with the fluid passageways provided in the rotary member, wherein the clearance space is disposed in fluid communication with the fluid pathways provided by the fluid transfer means. A sealing means is provided for sealably securing the clearance space. In a preferred form thereof, the rotary member includes a crankshaft, while the associated fluid passageways include two or more bore channels formed in the crankshaft.

One advantage of the present invention, as embodied in its form utilizing a stationary union to supply oil to the crankshaft, is that there is provided an oil film bearing to support the stationary union, enabling the crankshaft disposed thereabout to rotate in a lubricated environment and avoid the need for any anti-friction bearings.

Another advantage of the present invention is that high pressure fluid can be provided to two or more components of the press using only one fluid supplying device.

Yet another advantage of the present invention is the ability to apply different pressures of pressurized fluid to each of the two or more components of the press from a single pressure providing device.

Yet another advantage of the present invention, as embodied in its form utilizing a rotary union that is arranged for driving rotation by the shaft or element, is that there is provided a stationary housing unit forming a bearing support clearance space with the rotary union, in which a seal secured to the housing is not subjected to any friction-producing rotary contact.

Yet another advantage of the present invention involves its capacity within a power press application to transfer oil from a stationary pipe to a rotating crankshaft at oil pressure levels exceeding 1200 psi.

Yet another advantage of the present invention is that the clearance spaces formed between the rotary and stationary components are supplied with pressurized oil to create oil film bearings therein, thereby eliminating the hazard due to the pounding out of parts associated with free and undamped clearances.

Yet another advantage of the present invention is that the same high pressure oil supplied to the shaft or element's bore channel for use in lubricating a clutch/main bearing or other device such as adjustable stroke device or other fluid or pressure utilizing device, and is also used to meet the oil film requirements of the union components.

BRIEF DESCRIPTION OF THE DRAWINGS

The above-mentioned and other features and advantages of this invention, and the manner of attaining them, will become more apparent and the invention will be better understood by reference to the following description of an embodiment of the invention taken in conjunction with the accompanying drawings, wherein.

Corresponding reference characters indicate corresponding parts throughout the several views. The exemplification set out herein illustrates one preferred embodiment of the invention, in one form, and such exemplification is not to be construed as limiting the scope of the invention in any manner.

DETAILED DESCRIPTION OF THE INVENTION

Figure 1:
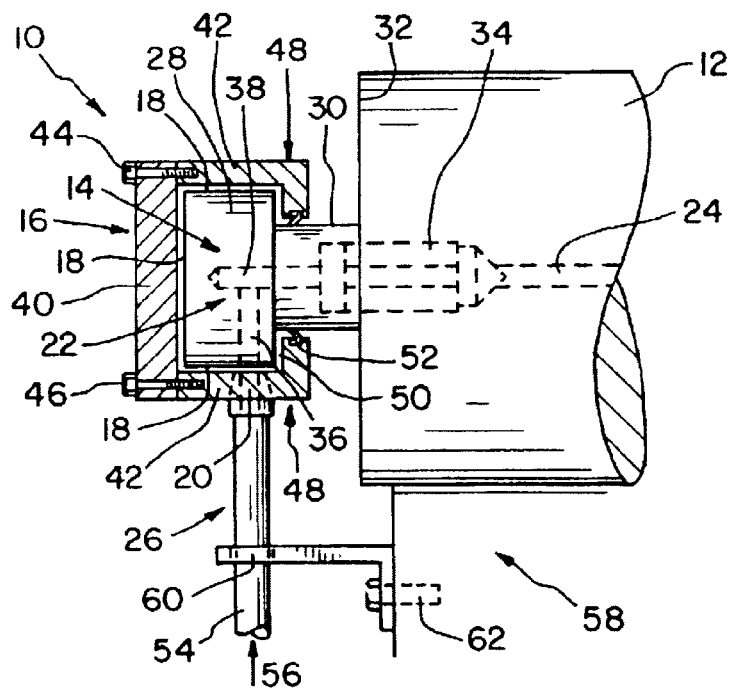
FIG. 1 is a longitudinal view taken in cross-section of a rotary union arranged for driving rotation by a crankshaft and adapted for use in supplying fluid to a bore channel formed in the crankshaft, in accordance with one embodiment of the present invention.
Figure 2:
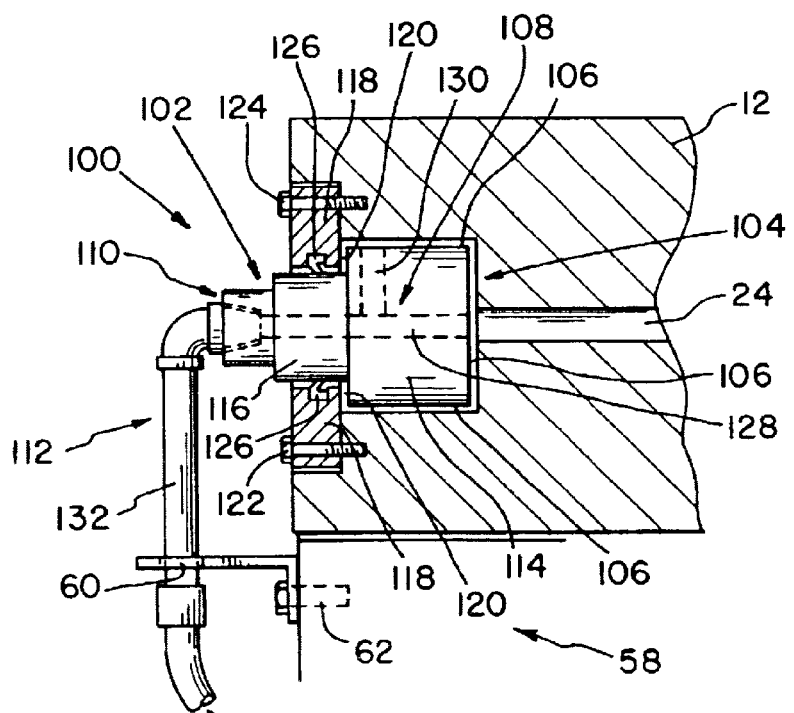
FIG. 2 is a longitudinal view taken in cross-section of a stationary union component which is disposed within a crankshaft cavity for use in providing fluid to the crankshaft bore channel, in accordance with another embodiment of the present invention.

Referring generally by way of overview to the schematic illustrations depicted in FIGS. 1 and 2, there are two embodiments of U.S. Pat. No. 5,901,643 directed to a system for supplying fluid to a rotatable crankshaft integrated within a mechanical press machine. U.S. Pat. No. 5,901,643 is incorporated herein by reference. The system illustrated by FIG. 1 utilizes a rotary union which is adapted for driving rotation by the crankshaft, wherein the rotary union is preferably installed as shown in exterior coupled relationship to the crankshaft. The concurrent tandem rotation of the rotary union and crankshaft is facilitated by a rigid engagement there between. Bearing support for the rotary union is provided by a lubricating oil film present within a clearance space defined between the rotary union and a stationary housing unit disposed thereabout. The system illustrated by FIG. 2 utilizes a stationary fluid transfer device disposed at least in part within a cavity formed within the crankshaft body. The transfer device is structured similarly to the rotary union of FIG. 1 but is adaptively installed for non-rotatable operation. Bearing support for the stationary transfer device is provided by a lubricating oil film present within a clearance space defined between the transfer device and the adjacent crankshaft cavity surface. In both of the illustrated embodiments, fluid is supplied through the applicable union component (i.e., the rotary union or stationary transfer device) and discharged into a bore channel formed in the crankshaft. More particularly, the union component includes a fluid pathway formed therein that is arranged in flow communication with the crankshaft bore channel. The fluid pathway is further arranged to supply fluid to the associated clearance space, enabling a lubricating oil film to be developed acting to provide bearing support. No sliding face seals are needed in either of the disclosed configurations.

Referring specifically to FIG. 1, there is shown a fluid delivery apparatus generally designated at 10 illustrating one embodiment of the present invention for use in supplying fluid to a crankshaft 12, as depicted in longitudinal cross-sectional view thereof. The illustrated apparatus 10 includes, in one form thereof, a rotary union generally designated at 14 and arranged for driving rotation by crankshaft 12, and further includes a stationary housing structure generally designated at 16 and disposed in spaced-apart relation to rotary union 14 to define an oil film clearance space 18 there between. Housing 16 includes, in one form thereof, a fluid passageway depicted in hidden view at 20 that is arranged in fluid communication with clearance 18 to supply fluid thereto. Rotary union 14 includes, in one form thereof, a fluid pathway generally designated at 22 enabling flow communication between clearance 18 and a fluid access channel 24 formed in crankshaft 12. Access channel 24 is preferably provided in the form of a bore-type structure, although any other suitable fluid-conveying formation or arrangement is hereby encompassed. The crankshaft access channel 24 is preferably arranged for flow communication with other machine parts, such as a clutch/main bearing (not shown). Fluid pathway 22 of rotary union 14 and fluid passageway 20 of housing 16 are arranged as shown in a preferred form thereof to permit alignable registration there between, enabling maximal flow therethrough. A fluid supply unit generally designated at 26 is adapted for rigid coupling to housing 16 and provides a fluid flow to housing passageway 20.

Figure 3:
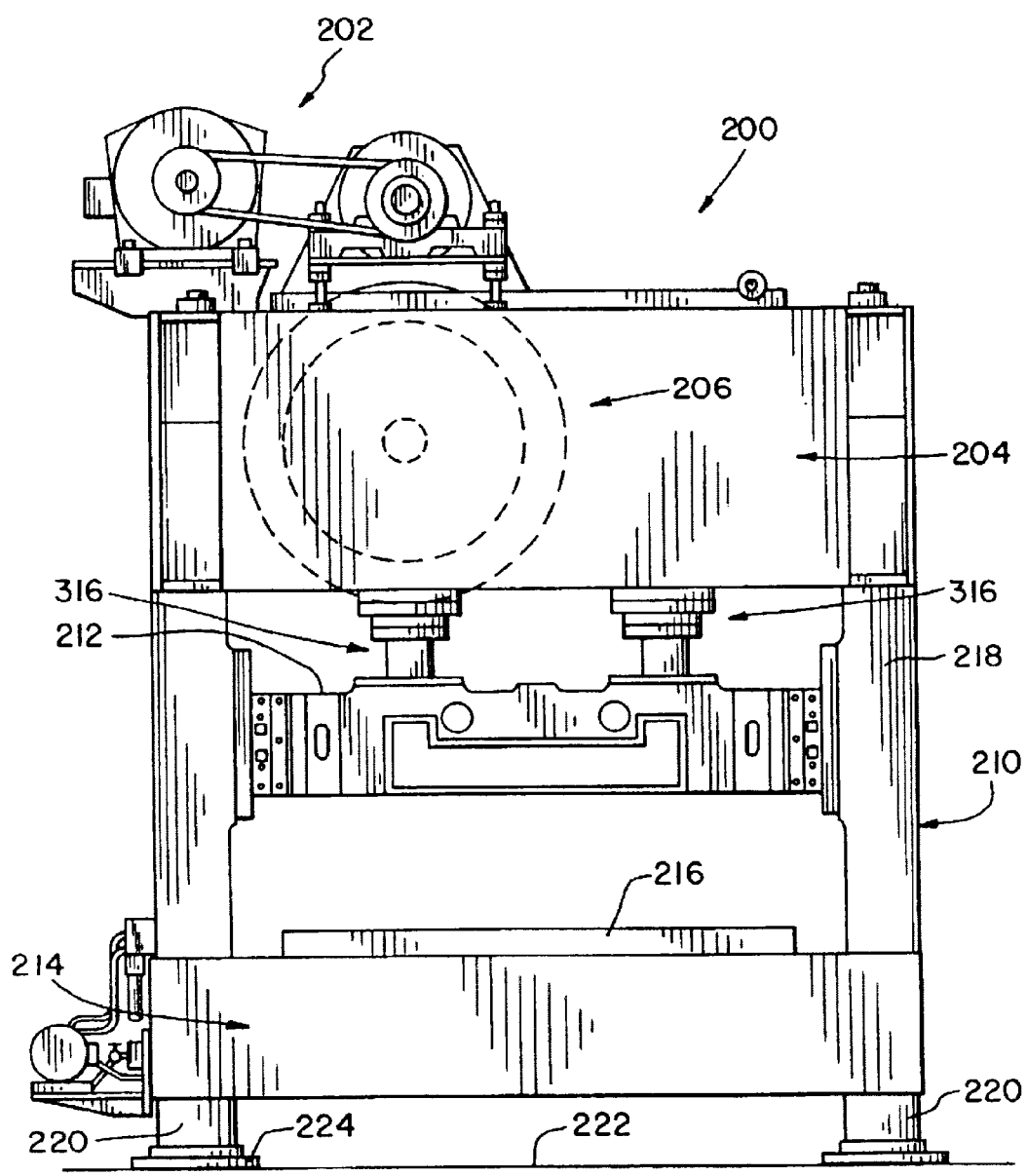
FIG. 3 is a front elevational view of a press machine in one illustrative form thereof.

The illustrated fluid delivery apparatus 10 broadly functions to supply fluid to access channel 24 through fluid pathway 22 of rotary union 14 during the entire rotational activity of crankshaft 12. Additionally, fluid is also provided to clearance 18 to form a lubricating oil film therein providing bearing support to rotary union 14 as it rotates concurrently with crankshaft 12. Referring now to FIG. 3, apparatus 10 forms an integral part of mechanical press 200 in accordance with a preferred implementation thereof. Conventional ones of the mechanical press are generally provided with a frame structure 210 including a crown portion 204 and a bed portion 214 having a bolster assembly 216 connected thereto, with upright members 218 connecting the crown portion 204 to the bed portion 214. The uprights 218 are integrally attached to the underside of the crown 204 and the upper side of the bed 214. A slide member 212 is positioned between the uprights 218 for rectilinear, reciprocating motion therein. Leg members 220 are formed as an extension of the bed and are generally mounted on the shop floor 222 by means of shock absorbing pads 224. A drive assembly includes a drive mechanism 202 connected by known conventional means to a flywheel/clutch combination, depicted generally at 206, for powering the rotational motion of the crankshaft. The crankshaft rotation is translated into reciprocating linear motion that powers the slide member using an intermediate assembly of connecting rods.

It will be appreciated in view of the following that the above description of the press and its various components is merely illustrative and not intended to have any limiting effect herein, as those skilled in the art will recognize that any other mechanical press may be adapted to incorporate the teachings of the present invention. Furthermore, the fluid delivery apparatus according to the present invention is not limited in its applicability to the mechanical press configuration disclosed herein, but may be adapted for use in any arrangement utilizing rotary devices or any other moving component.

Referring now to the individual components of fluid delivery apparatus 10, rotary union 14 is provided as shown in the form of a unitary structure including a head portion 28 integrally formed to a body portion 30 coupled to crankshaft 12 at one end surface 32 thereof. Head portion 28 generally defines a solid cylindrical structure while body portion 30 is suitably structured for integral engagement with crankshaft 12. Rotary union 14 generally operates such that its movement is substantially restricted to rotational motion, which in turn is subject to control from rotary influences generated by crankshaft 12. For this purpose, rotary union 14 is rigidly coupled to crankshaft 12 at body portion 30 thereof. This coupling may be implemented, in one illustrative example, by using a removable adaptor element (shown in hidden view at 34) threadably received in body portion 30 at one end thereof and threadably received in crankshaft 12 at another end thereof. Alternatively, adaptor 34 may be integrally formed into either rotary union 14 or crankshaft 12 as a permanent part thereof. This description of adaptor 34 should not serve as a limiting feature herein, as it should be apparent that any means may be provided to integrally join rotary union 14 and crankshaft 12 in a rigid engagement. The rigidity of this engagement is at least sufficient to configure rotary union 14 so that it operates in concurrent rotating relationship with crankshaft 12, i.e., components 12 and 14 will rotate substantially in unison.

Rotary union 14 includes as shown the illustrated fluid pathway 22 for use in establishing flow communication with access channel 24 formed in crankshaft 12. Fluid pathway 22 includes, in one form thereof, a fluid channel 36 arranged in flow communication at one end thereof with clearance 18 and arranged in flow communication at another end thereof with fluid channel 38, which is disposed for fluid communication with access channel 24 through adaptor 34. As shown, fluid channel 36 is disposed in a generally radial direction and fluid channel 38 is disposed in a generally longitudinal direction. In a preferred aspect, access channel 24 is coextensive with the rotational axis of crankshaft 12; accordingly, channel 38 is preferably disposed in collinear relation to access channel 24. The illustrated fluid pathway 22 should not be considered as a limiting feature but should be viewed as broadly representative of any means provided in rotary union 14 by which fluid may be transferred from a fluid inlet thereof to crankshaft 12.

Housing 16 is provided as shown in the form of an enclosure unit to develop a spatial separation with rotary union 14 for defining clearance space 18 suitable for the formation of a lubricating oil film provided therein. Housing 16 is adapted for fixed placement relative to rotary union 14 using a rigid engagement with supply unit 26 (discussed below). The illustrated housing 16 includes, in one form thereof, a retainer plate 40 integrally attached to a retainer sleeve 42 with securing bolts 44 and 46 to form a frame structure or casing arranged to provide a bearing surface relative to rotary union 14. Retainer plate 40 generally defines a disc-shaped structure disposed in facing opposition to rotary union 14 at an outer surface of head portion 28, with clearance space 18 there between. Retainer sleeve 42 generally defines a cylindrical structure annularly disposed about rotary union 14 at a radial surface of body portion 30, with clearance space 18 there between. Retainer sleeve 42 is preferably provided with an inward radially-disposed annular end portion 48 oriented to define a clearance space 50 (contiguous with clearance space 18) at the discontinuous boundary between head portion 28 and body portion 30 of rotary union 14. The inward end portion 48 is annularly disposed about rotary union 14 at body portion 30, which extends therethrough. The particular configuration for housing 16 disclosed herein should not be considered in limitation thereof but instead is generally representative of any structure capable of developing a clearance space with at least part of rotary union 14 sufficient to enable the formation of an oil film therein that assists in the lubrication of rotary union 14 during its rotation.

Housing 16 is preferably constructed to provide fluid passageway 20 in one side of retainer sleeve 42 thereof. In a preferred aspect, the orientation of fluid passageway 20 relative to fluid pathway 22 (at radial channel 36 thereof) in rotary union 14 is properly arranged to enable a registration there between that is sufficient to establish flow communication during at least part of the rotation of rotary union 14. High-pressure oil supplied through passageway 20 would have maximum throughput into rotary union 14 when passageway 20 and fluid pathway 22 are suitably constructed to permit the occurrence of collinear alignment there between during the rotation of rotary union 14.

A seal 52 prevents oil leakage from clearance space 50 and is provided in the form of a ring structure annularly disposed about rotary union 14 at body portion 30 thereof. An oil drain (not shown on FIG. 1) is located between seal 52 and the oil film. Seal 52 is preferably secured as shown by fixed attachment to retainer sleeve 42 at end walls of the inward annular end portion 48 thereof. Accordingly, seal 52 constitutes a stationary (i.e., non-rotational) element. The sufficient ring-type construction and fixed placement of seal 52 contrasts favorably with prior art seals, which are typically provided in the form of an apertured disc that is required either to rotate with the rotary union or be subject to frictional forces since it serves as the interface between a stationary rotary union and the rotating end surface of the crankshaft. More generally, by placing rotary union 14 in concurrent driving rotation with crankshaft 12, this arrangement facilitates the use of a stationary seal in the indicated manner and thereby eliminates the adverse condition found in prior art configurations involving a seal at the interface between a stationary union device and the rotating crankshaft. Here, in the illustrated embodiment, there is not provided any such stationary-rotary interface; accordingly, seal 52, which has no facial portion in contact with a rotating part, remains free from any exposure to an abrasive activity such as that found in the prior art sliding face seals. There is a drain located between seal 52 and clearance space 18.

Supply unit 26 includes a pipe 54 which is adapted at one end to receive an inflow 56 of pressurized fluid from a fluid source (not shown) and which is adapted at another end for rigid coupling to housing 16 in a manner suitably arranged to permit flow communication there between. In particular, pipe 54 is fitted at one end with a tapered coupling element that is securely attached to housing 16 at fluid passageway 20 to permit an uninterrupted fluid flow therein from pipe 54. Pipe 54 is rigidly secured to the press crown (shown illustratively at 58) using a bracket 60 and bolt 62 combination. Accordingly, housing 16 is rendered stationary through its rigid coupling to crown 58 via pipe 54 and bracket 60. However, this manner of fixed securing and the particular implementing structures should not be considered in limitation but should be viewed as broadly representative of any means capable of inhibiting rotational motion of housing 16. Additionally, even though pipe 54 serves a dual purpose in transporting fluid and assisting in the rigid securing of housing 16, it should be apparent that pipe 54 or any other equivalent means may be used to provide fluid while other independent means may be provided to render housing 16 stationary.

During operation, a pressurized fluid flow 56 is introduced into pipe 54 and travels to fluid passageway 20 formed in housing 16, whereupon the fluid flow is admitted into clearance space 18. The incoming fluid will at least enter clearance space 18 and will also be admitted into radial fluid channel 36 (provided in rotary union 14) in accordance with and in dependence upon its orientation relative to fluid passageway 20. High-pressure oil admitted into radial fluid channel 36 continues along the remainder of fluid pathway 22 (i.e., axial fluid channel 38) and is discharged into the crankshaft access channel 24. The pressurization level of the incoming fluid is sufficient to develop a flow within the crankshaft access channel 24 that is capable of reaching at least the clutch/main bearing sites, which are arranged in flow communication with access channel 24. The pressurization is also sufficient to distribute fluid substantially throughout the annular bearing region disposed between rotary union 14 and housing 16 and defined by clearance space 18. The fluid present in clearance space 18 and clearance 50 (proximate seal 52) establishes an oil film that acts in cooperation with rotary union 14 to provide an effective bearing support structure for housing 16. Additionally, there is a cooperative influence involving the lubricating film areas and housing 16 (particularly at retainer plate 40 and the inward annular end portion 48 of retainer sleeve 42) that integrally forms an effective thrust bearing structure which acts to inhibit any linear motion in rotary union 14 while at the same time continuing to provide lubricating support for the permissible rotary motion. The film areas associated with clearance spaces 18 and 50 generally do not exhibit any significant pressure-induced motion activity that might otherwise develop in response to pressure differentials arising from continuous interactions with incoming high-pressure oil. Accordingly, these film areas may be considered hydrostatic bearing support regions in the illustrated embodiment. The oil film bearing in clearance spaces 18 and 50 ensures that there is no free and undamped clearance between stationary housing 16 and rotary union 14, which otherwise could lead to stamping out of the respective components during high levels of vibration severity propagating through the machine press.

By way of general description and not in limitation thereof, it is hereby considered that the fluid delivery apparatus according to the embodiment illustrated by FIG. 1 comprises, in one general form thereof, a system for delivering fluid to a rotary member having a fluid passageway provided therein. The system includes a rotary union device that is disposed for driving rotation by the rotary member and which provides a fluid pathway disposed in flow communication with the fluid passageway provided in the rotary member. The system further includes a support structure which is adapted at least in part for flow communication with the fluid pathway provided by the rotary union device and which is arranged to provide operative bearing support to the rotary union device. In one form thereof, the support structure includes a housing means, defining a clearance space with at least part of the rotary union device, for providing a fluid pathway which is disposed in flow communication with the clearance space and which enables flow communication with the fluid pathway provided by the rotary union device.

The fluid delivery apparatus of FIG. 1 is accordingly not limited to a mechanical press application but encompasses the delivery of fluid from a rotary union device to any rotatable machine element, such as a crankshaft. More generally, the teachings of the illustrated embodiment encompass any form of fluid transfer device integrally arranged in motion-dependent relationship with any movable component and which enables the fluid transfer device to be disposed in flow communication with a fluid space within the movable component as both parts move in tandem. Additionally, the fluid delivery apparatus may be adapted to accommodate its integral connection to components having motion activity other than rotary displacements, such as rectilinear motion.

Referring now to FIG. 2, there is shown a fluid delivery apparatus generally designated at 100 illustrating another embodiment of the present invention for use in supplying fluid to a crankshaft 12, as depicted in longitudinal cross-sectional view thereof. The illustrated apparatus 100 includes, in one form thereof, a stationary fluid transfer device generally designated at 102 disposed at least in part within a cavity generally designated at 104 to define an oil film clearance space 106 there between. Transfer device 102 includes a fluid pathway illustratively designated at 108 and arranged in flow communication with access channel 24 of crankshaft 12 for transferring fluid admitted at an inlet portion 110 thereof to the crankshaft access channel 24 and to clearance space 106. Transfer device 102 is adapted for non-rotation, in one form thereof, through a rigid coupling involving fluid supply unit 112.

Referring specifically to the illustrated transfer device 102, there is provided inlet portion 110 adapted for fluid flow therein; a head portion 114 preferably disposed in its entirety within crankshaft cavity 104 and defining clearance space 106 with cavity 104; and a body portion 116 integrally formed at opposite sides thereof to inlet portion 110 and head portion 114. Transfer device 102 may generally be regarded as forming in part an insert body arranged for permanent and fixed placement within crankshaft 12 at cavity 104 thereof. Additionally, transfer device 102 generally defines a structural formation similar to rotary union 14 in FIG. 1. However, while rotary union 14 is arranged for driving rotation by crankshaft 12, transfer device 102 is arranged as a stationary element disposed at least in part within crankshaft 12. Furthermore, while housing 16 is used to define a clearance space with rotary union 14, the inner surface of crankshaft cavity 104 defines clearance space 106 with transfer device 102. Both components, though, supply fluid to the crankshaft access channel 24 and utilize this same fluid to generate a lubricating oil film within its respective clearance space. The disclosed configuration for transfer device 102 should not be considered in limitation thereof but should be viewed as broadly representative of any component adapted for non-rotation and capable of transmitting fluid to a machine fluid port such as crankshaft access channel 24.

Referring again to FIG. 2, there is further provided a retaining collar 118 integrally associated with crankshaft 12 and annularly disposed about transfer device 102 at body portion 116 thereof. Collar 118 is rigidly secured to crankshaft 12 using a bolted arrangement employing illustrative bolts 122 and 124. Collar 118 is suitably arranged to form with transfer device 102 an oil film clearance space 120 there between, which is preferably contiguous with clearance space 106. A seal 126 is provided in the form of a ring structure annularly disposed about transfer device 102 at body portion 116 thereof to prevent leakage of oil present in clearance space 120. Seal 126 is fixedly secured by retaining collar 118 at inward end walls thereof. Accordingly, seal 126 moves in unison with retaining collar 118, which moves in dependence upon crankshaft 12 due to its rigid association therewith.

Referring specifically to fluid pathway 108 provided in transfer device 102, this passageway establishes flow communication with at least clearance space 106 in a manner sufficient to enable flow communication with crankshaft access channel 24. In a preferred form thereof, fluid pathway 108 includes an axial fluid channel 128 disposed at one end in flow communication with the fluid inlet of inlet portion 110 and disposed at another end in flow communication with access channel 24 through clearance space 106 interposed there between. In particular, axial fluid channel 128 is preferably arranged in sufficient fluid registration with access channel 24 (e.g., a collinear arrangement) such that flow communication is thereby continuously established between transfer device 102 and crankshaft 12 at all rotational displacements thereof. Fluid pathway 108 preferably includes at least one lateral fluid channel 130 branching from axial channel 128 and arranged in flow communication with clearance space 106. The illustrated fluid pathway 108 should not be considered in limitation thereof but should be viewed as broadly representative of any fluid-conveying formation capable of transporting fluid through transfer device 102.

In a preferred form thereof, fluid pathway 108 may include at least one pair of lateral fluid channels oriented opposite one another relative to axial channel 128 to provide fluid to clearance space 106 at opposite sides of cavity 104. As a result, the high-pressure discharge occurring from oppositely-directed lateral channels will act as a stabilizing influence tending to balance transfer device 102 within a fixed orientation relative to cavity 104 and inhibit any lateral movement. In particular, what is created by such pairs of oppositely disposed lateral channels is a symmetrical flow pattern within clearance space 106 that tends to induce a balanced pressurization of the oil film at both sides of the crankshaft axis acting to stably locate transfer device 102 relative to crankshaft 12. Even though transfer device 102 and crankshaft 12 are fixedly installed, their large masses have significant inertial influences that may permit otherwise small mechanical disturbances to increase unimpeded if left undamped, possibly leading to machine displacements exceeding the allowed failure tolerances. The film balancing acts with a damping effect to suppress and resist such unwanted displacements.

Transfer device 102 is arranged in fixed relation to crankshaft 12 using a rigid engagement with fluid supply unit 112. Supply unit 112 includes a pipe 132 which is adapted at one end to receive an inflow 134 of pressurized fluid from a fluid source (not shown) and which is adapted at another end for rigid coupling to transfer device 102 in a manner that is suitably arranged to permit flow communication there between. In particular, pipe 132 is fitted at one end with a tapered coupling element that is securely attached to transfer device 102 at its inlet portion 110 enabling flow communication with fluid pathway 108. Pipe 132 is rigidly secured to the press crown (shown illustratively at 58) using a bracket 60 and bolt 62 combination. However, this manner of fixed securing and the particular implementing structures should not be considered in limitation should be viewed as broadly representative of any means capable of inhibiting rotational motion of transfer device 102. Additionally, even though pipe 132 serves a dual purpose in transporting fluid and assisting in the rigid securing of transfer device 102, it should be apparent that pipe 132 or any other equivalent means may be used to supply fluid while other independent means may be provided to render transfer device 102 stationary.

During operation, a pressurized fluid flow 134 is introduced into pipe 132 and admitted into fluid pathway 108 at axial channel 128 thereof. This high-pressure oil flow continues along axial channel 128 and is eventually discharged into the crankshaft access channel 24 after traversing clearance space 106 disposed there between. A portion of the fluid flow is routed through lateral fluid channel 130 and emerges at clearance space 106 there at. The fluid flow in clearance space 106 proximate lateral channel 130 will principally involve a flow component traveling in a forward direction through clearance space 106 towards access channel 24 where it joins with the fluid flow discharged from axial channel 128. Accordingly, film areas associated with clearance space 106 located forward of lateral radial channel 128 may be considered hydrodynamic bearing support regions in the illustrated embodiment, since fluid therein exhibits continuous motion under the influence of pressurized oil as it travels this forward path to reach the crankshaft access channel 24. The pressurization of the incoming oil flow 134 is sufficient to enable an adequate distribution of oil throughout the lubricating bearing support region defined by clearance space 106 and arranged between transfer device 102 and crankshaft cavity 104. The pressurization is preferably sufficient, moreover, to develop a flow within crankshaft access channel 24 that is capable of reaching other machine bearing sites arranged in flow communication with access channel 24. A more uniform oil distribution pattern may be established in clearance space 106 by using plural ones of the lateral fluid channels in an arrangement disposed annularly about and along axial fluid channel 128.

A much smaller portion of fluid admitted from lateral channel 130 will migrate towards and collect in clearance space 120 proximate seal 126. The fluid present in clearance space 120 generally does not experience any pressure-differential influences and is thereby considered a relatively static film area in comparison to film areas developed elsewhere in clearance space 120. Accordingly, these film areas at clearance space 120 may be considered hydrostatic bearing support areas. These film areas combine with retaining collar 118 to integrally form an effective thrust bearing structure that acts to inhibit any rearwardly-directed linear motion in transfer device 102. Similarly, the film areas present in clearance space 106 at its transverse section proximate access channel 24 act to inhibit linear motion of transfer device 102 in the forward direction. Radial bearing support is provided to transfer device 102 by an oil film present in clearance space 106 at its axial sections. Because the stationary part (i.e., fluid transfer device 102) is supported by an oil film bearing, which permits crankshaft 12 to rotate in a lubricated environment while being disposed about the stationary part, there is no requirement for anti-friction bearings. Additionally, the oil film bearing in clearance spaces 106 and 120 ensures that there is no free and undamped clearance between stationary fluid transfer device 102 and crankshaft 12 (at cavity 104 thereof), which otherwise could lead to stamping out of the respective components during high levels of vibration severity propagating through the press machine.

By way of general description and not in limitation thereof, it is hereby considered that the fluid delivery apparatus according to the embodiment illustrated by FIG. 2 comprises, in one general form thereof, a system for delivering fluid to a rotary member having a fluid passageway provided therein. The system includes a fluid transfer device, which is adapted for non-rotation and disposed at least in part within a cavity of the rotary member to define a clearance space there between, for transferring fluid received at an inlet thereof to the fluid passageway provided in the rotary member. It is preferably provided that fluid also be delivered to the clearance space. The fluid transfer device includes, in one form thereof, a fluid pathway disposed in flow communication with the clearance space and with the fluid passageway provided in the rotary member.

The fluid delivery apparatus of FIG. 2 is accordingly not limited to a mechanical press application but encompasses the delivery of fluid from a stationary fluid transfer device to any rotatable machine element, such as a crankshaft. More generally, the teachings of the illustrated embodiment encompass any form of stationary fluid transfer device arranged at least in part within the interior body of a movable component to establish flow communication with a fluid space contained within the movable component. Additionally, the fluid delivery apparatus may be adapted to accommodate its integral placement within components having motion activity other than rotary displacements, such as rectilinear motion. The above description represents the generalized and particular aspects of a rotary union with a single channel as depicted in U.S. Pat. No. 5,901,643 invented by myself.

Figure 4:
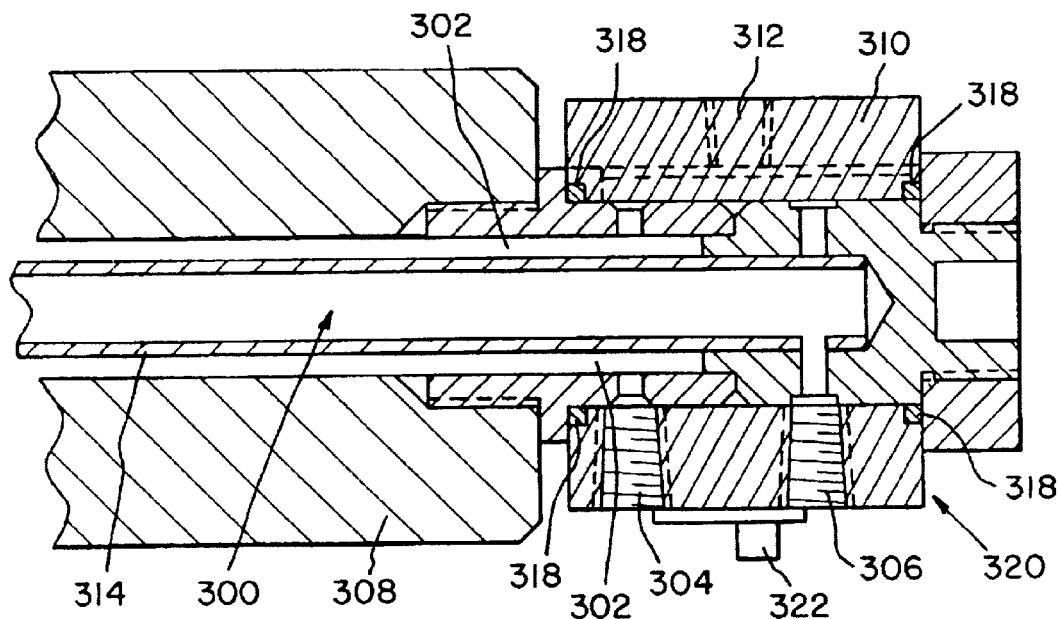
FIG. 4 is a cross-sectional view of a rotary union arranged for driving rotation by a shaft and adapted for use in supplying fluid to a channel formed in the shaft.
Figure 5:
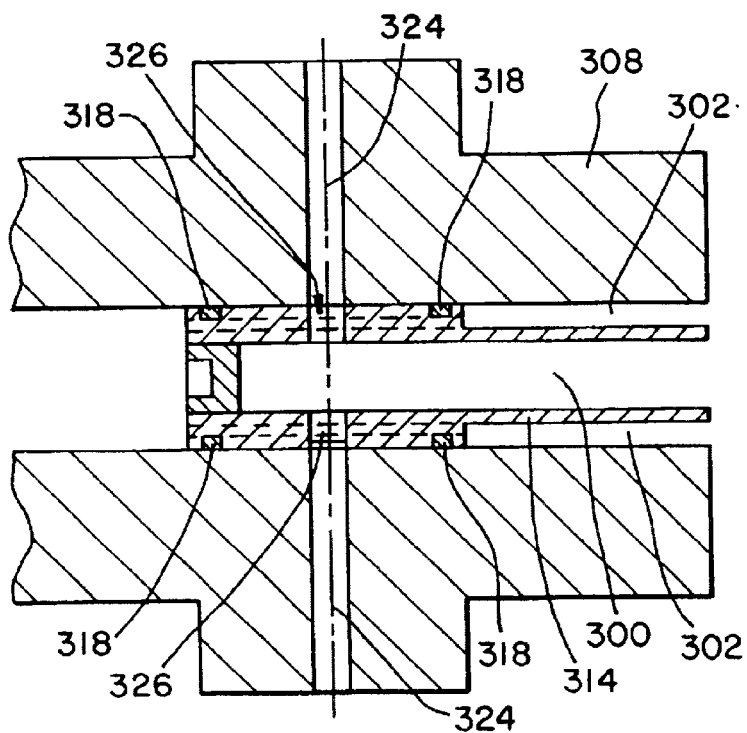
FIG. 5 is a cross-sectional view of the fluid traveling through both fluid passageways and traveling to separate slide components.

In perferred embodiment of the present invention, as shown in FIGS. 4 and 5, there is a novel fluid delivery system that will supply fluid through a dual pathway to a rotatable crankshaft integrated within a mechanical press. The invention is not limited to a crankshaft and can be any shaft or other rotable member. Also, the fluid delivery system is not limited for use in a press but can be used in any apparatus that utilizes a fluid delivery system. This fluid delivery system will permit two different high-pressure oil supplies or fluids to be supplied to rotating member, such as crankshaft 308. The present invention is not limited to two passageways and more passageways can be utilized as well. The two oils supplied to rotating crankshaft 308 can be the same high-pressure oil. Also, oils other than high-pressure oils can be used as well. First fluid pathway 300 has a first fluid pathway entrance 306 to allow fluid or oil to he supplied to first fluid pathway 300. Second fluid pathway 302 has a second fluid pathway entrance 304. Second fluid pathway entrance 304 is utilized to allow fluid or oil to be supplied to second fluid pathway 302. First fluid pathway 300 and second fluid pathway 302 are located in crankshaft 308. First fluid pathway entrance 306 and second fluid pathway entrance 304 are supplied the oil or fluid by a hose or a pipe connected to a supply means 322 and the hose or pipe is threaded or clamped to a stationary housing 310. Stationary housing 310 will be supported by an oil film at clearance 311 between rotary union 320 and stationary housing 310. The clearance 311 will be small enough to permit a small amount of oil to support stationary housing 310 and not cause the oil or fluid to leak through the oil film. The clearance 311 will be small enough between first fluid pathway entrance 306 and second fluid pathway entrance 304 so as not to lose pressure to the other pathway.

On the outside of first fluid pathway entrance 306 and second fluid pathway entrance 304, the oil film clearance 311 will only permit a very small amount of oil to leak to drain 312. The oil will still have enough volume and pressure to support stationary housing 310 during crankshaft 308 rotation.

The oil supply from supply means 322 travels to two or more slide components, such as slide connections 316, located outside of crankshaft 308. The oil could be used to expand the eccentric for changing the stroke and for bearing lubrication when operating in a press. Other possible uses of the oil in other devices could be utilized as well. First fluid pathway 300 utilizes a piece of tubing 314 to control the oil supplied to and traveling through first fluid pathway 300 to a first slide component. A second oil will travel to a second slide component through a series of openings 326 in crankshaft 308. Seals 318 are provided to prevent leakage of the oil traveling to the second slide component into first fluid pathway 300 oil supply.

The two slide components which are fastened to the slide and mounted to the crankshaft, have the oil for the bearing supplied from second fluid pathway 302. The oil for second slide component will enter rotary union 320 at second fluid entrance 304 and a very small amount will enter the bushing (not shown) and support stationary housing 310. The small amount of oil that gets through the bushing will enter drain 312 and leave rotary union 320 through drain 312. The oil will return to the oil reservoir (not shown) to be used another time.

The oil in first fluid pathway 300, 306 will not mix with the oil from second fluid pathway 302, 304 as the oil is supplied to both of the slide components because first fluid pathway 300 is not in communication with second fluid pathway 302. The oil in first fluid pathway 300 stays in tubing 314 until the oil reaches a slide component pathway 324. The oil in second fluid pathway 302 travels through at least one opening 326 until the oil reaches first slide component pathway 324 wherein slide component pathway 324 is in fluid communication with the first slide component. Openings 326 in second fluid pathway 302 do not intersect with first fluid pathway 300 or first slide component pathway 324 and therefore the oil traveling to the first slide component and the oil traveling to the second slide component do not come into contact with one another.

The present invention is novel as other types of rotary unions have one input, are mounted on anti-friction bearings, and operate with a face seal to prevent oil leaking between the stationary and the rotating members.

While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A fluid delivery system for supplying two or more fluids to a rotary machine, said system comprising:

a shaft having two or more fluid pathways, each said fluid pathway being essentially fluidly separate from each other said fluid pathway, said two or more fluid pathways being non-intersecting relative to one another;

a rotary union, disposed for driving rotation by said shaft, in fluid communication with said two or more fluid pathways provided in said shaft;

a housing defining a clearance space with at least part of said rotary union and providing a fluid drain pathway disposed in fluid communication with said clearance space, said clearance space configured for containing an oil film between said housing and said rotary union; and a sealing means for sealably securing said clearance space.

2. The fluid delivery system as recited in claim 1, wherein said two or more fluid pathways in said shaft are channels.

3. The fluid delivery system as recited in claim 2, wherein said channels are bore channels.

4. A mechanical press, comprising:

a frame structure with a crown and bed;

a slide guided by said frame structure for reciprocating movement in opposed relation to said bed;

a drive mechanism associated with said frame structure;

a flywheel assembly rotatably driven by said drive mechanism, said flywheel assembly including a flywheel rotatable relative to said frame structure;

a shaft rotatably disposed within said crown and in driving connection with said slide, said shaft including two or more fluid pathways formed therein, each said fluid pathway being essentially fluidly separate from each other said fluid pathway, said two or more fluid pathways being non-intersecting relative to one another;

a clutch assembly for selectively connecting said flywheel to said shaft for driving rotation thereof; and a fluid delivery system for providing fluid to said two or more fluid pathways formed in said shaft, said fluid delivery system comprising:

a rotary union, disposed for driving rotation by said shaft, in fluid communication with said two or more fluid pathways formed in said shaft;

a housing means for defining a clearance space with at least part of said rotary union and for providing two or more fluid pathways disposed in fluid communication with said clearance space, said clearance space being disposed in fluid communication with said rotary union; and sealing means for sealably securing said clearance space.

5. The press as recited in claim 4, further comprising:

a supply means, rigidly coupled to said housing means, for supplying fluid to said two or more fluid pathways provided by said housing means.

6. The press as recited in claim 5, wherein said supply means supplies two or more different fluids to said two or more fluid passageways provided by said housing means.

7. The press as recited in claim 5, wherein said supply means supplies one fluid to said two or more fluid passageways provided by said housing means.

* * * * *